May 7, 1968 G. R. LAVERING ET AL 3,381,551
HAND-HELD DRILL GUIDE
Filed April 14, 1965
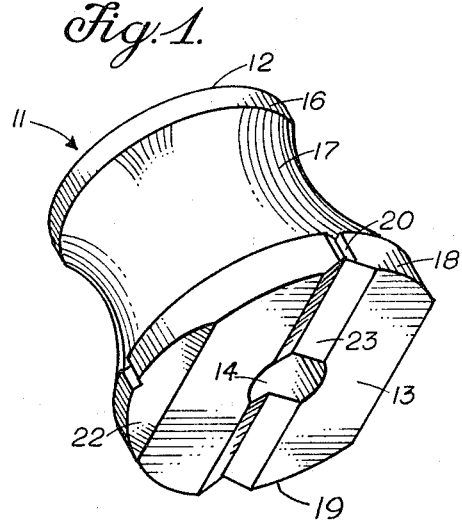
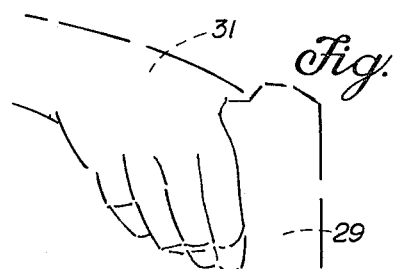
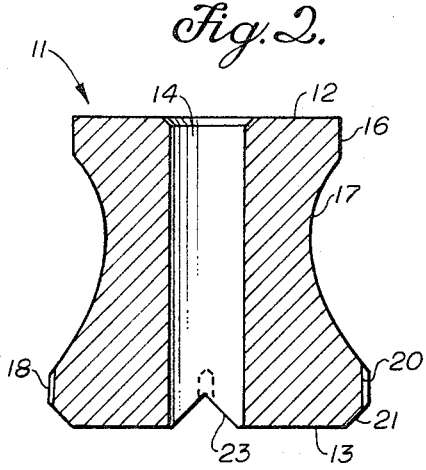
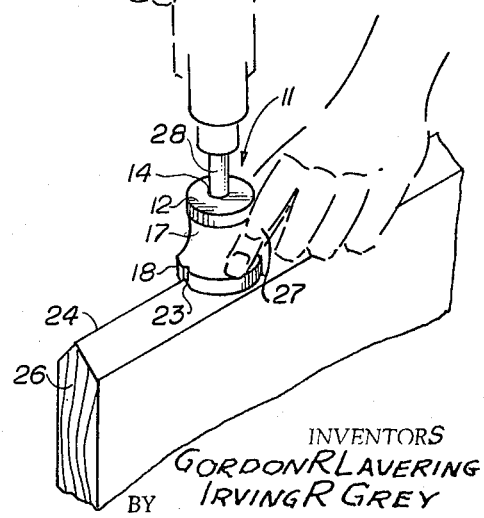
INVENTORS
GORDON R LAVERING
IRVING R GREY
BY
Fryer Tjensvold Feix & Phillips
ATTORNEYS United States Patent Office

3,381,551
Patented May 7, 1968

3,381,551
HAND-HELD DRILL GUIDE
Gordon R. Lavering, 1927 Bay View Ave., Belmont, Calif.
94002, and Irving R. Grey, 979 Ashbury St., San
Francisco, Calif. 94117
Filed Apr. 14, 1965, Ser. No. 448,041
1 Claim. (Cl. 77—55)

ABSTRACT OF THE DISCLOSURE

A drill guide designed to be held entirely by hand. The drill guide is of essentially cylindrical configuration with a flat bottom surface normal to the axis of the cylinder. Essentially the entire peripheral cylindrical surface of the guide is shaped into a smooth concavely curved arc whereby finger pressure exerted on said arcuate portion results in a downward component of pressure forcing the guide tightly against the surface to be drilled. Notches and bevels are also provided in the bottom surface of the guide in order that the device may be utilized on edges or exterior arcuate surfaces as well as on interior corners.

---

The present invention is related to guides for drills, and more particularly to drill guides that are positioned and held by hand.

Electric hand drills have come into universal use within recent years, and they find application for drilling holes both in wooden, composition and metal objects. Very often it is desired to drill a hole into a part that must be precisely aligned with respect to the part's surface. For instance, when two wooden boards are to be joined at their edges, it is important to insert dowel rods therein which are perfectly aligned with the board edges so that when the boards are placed together and the dowels inserted, the resulting surface will be flat and smooth. Further, it is often desired to drill a hole into a flat surface wherein the hole is perfectly perpendicular thereto. In other instances it is often desired to drill a hole into a rounded surface, such as a dowel or the like.

To drill a perfectly aligned hole or a hole that is exactly perpendicular to a flat surface, or to drill a hole into a rounded surface is extremely difficult when a power drill is hand held. To fill this need many types of "jig" devices are available whose purpose is to precisely align the drill bit with respect to the part in which the hole is to be made. Generally speaking, however, such "jig" devices must be clamped to the workpiece and further include several moving parts, all of which must be precisely aligned, clamped and set before a suitable hole can be drilled. In addition, such "jigs" are often unsuitable for use in positions where they cannot easily be clamped to the work part, are often quite tedious to adjust and set up, and further are usually expensive to purchase.

It is, therefore, an object of this invention to provide a simple, one piece drill guide device.

It is another object of the invention to provide a drill guide that is hand held on the workpiece.

It is a further object of the invention to provide a hand-held drill guide that is "clamped" to the workpiece by simple finger pressure and need not be physically clamped to the workpiece.

It is yet another object of the invention to provide a hand-held drill guide that is simple and durable in construction and which aligns a power drill bit to provide a precisely located hole within a workpiece.

It is yet another object of the invention to provide a hand-held drill guide that permits the drilling of holes in a curved surface of revolution without the necessity of a complicated clamping mechanism.

Further objects and advantages of the invention will be understood from the following specification taken in conjunction with the drawings of which:

FIG. 1 is a perspective view of the hand-held drill guide of the invention;
FIG. 2 is a cross-sectional view taken along the longitudinal plane of the drill guide; and
FIG. 3 is an illustration showing the hand-held drill guide in use.

With reference to the drawing, it will be seen that the hand-held drill guide of the invention comprises but a single part 11 having an upper flat surface 12 that is normal to the longitudinal axis of the cylindrical drill guide. A rather flat surface 13 comprises the bottom or other end of the drill guide. This surface, like upper surface 12, also is normal to the longitudinal axis of the drill guide. A hole, or bore 14 coincident with the longitudinal axis of the guide 11 passes therethrough from upper surface 12 to lower surface 13.

The peripheral surface of guide 11 between upper surface 12 and lower surface 13 is divided into three distinct sections. Immediately adjacent upper surface 12 is a short cylindrical section 16. Immediately below cylindrical section 16 is an arcuate portion 17 that comprises the principal area of the peripheral surface between upper surface 12 and bottom surface 13. Arcuate surface 17 smoothly curves concavely inward from the lower edge cylindircal surface 16 and flares smoothly outward to a lower section 18 whose bottom edge 19 forms the circumference of bottom surface 13. Lower section 18 is essentially cylindrical, however, it has a slight taper inwardly from lower edge 19 to arcuate portion 17.

At 90° intervals around the outer surface of lower section 18 are scribed small vertical notches 20. Further, on diametrically opposite sides of lower section 18 are cut 45° bevels 21 and 22. A 90° V-notch 23 is formed into bottom surface 13 along a diameter of guide 11.

The diameter of guide 11 is made of a suitable length such that the device may be easily grasped between the thumb and index finger of the user. In addition arcuate section 17 is cut sufficiently deep into the body of guide 11 and is of a vertical length as to easily accommodate the thumb and index fingertips of the user.

Drill guide 11 is most suitably made from a heavy, sturdy and wear resistant material, i.e. steel, which has been hardened or treated to provide a surface durability equal to or greater than that of drill bit material.

Bore 14 in drill guide 11 is of sufficient diameter to permit free rotation of any specified drill bit size without binding and is yet of such a fit as to restrict movement of such drill bit from a non-perpendicular attitude to the bottom surface 13. Thus when any drill bit is inserted into a suitably sized hole 14 of the drill guide 11, it will be maintained in perfect vertical alignment with space 13.

In order to be most useful, drill guide 11 can be made up in sets having holes 14 of varying diameter suitable to accommodate a complete set of drill bits.

The drill guide of the invention is most simple to use. Generally speaking it is only necessary to select a guide with a hole 14 of suitable diameter to just accommodate a drill bit of the desired diameter. The guide 11 is then placed with bottom surface 13 against the surface into which the hole is to be drilled. Notches 20 will serve to align the guide and drill bit with the exact spot at which the hole is to be drilled.

For instance it is only necessary to select the exact point on the work surface at which the hole is to be drilled. Then two straight lines are marked or scribed on the work surface crossing at right angles exactly at the point to be drilled. The guide 11 is then placed on the work surface and notches 20 are lined up with the index lines. Once each notch is aligned to overlie a line the guide 11 will have its exact center coincident with the point at which the hole is to be drilled.

A center punch or locating mark may be placed at the point at which the hole is desired. The drill bit may be placed through the hole in the hand-held guide, so that the drill point extends out the bottom face. The point may then be placed in the center punched mark and the drill guide slid down the drill bit until it contacts the work properly. This eliminates the need for index marks on the work surface.

The guide is grasped between the thumb and index finger with both fingers resting in arcuate portion 17. The drill bit is inserted into the hole 14 and the power drill is actuated to rotate the bit. It has been found that only moderate downward finger pressure on guide 11 will hold it firmly in position on any work surface. The shape of arcuate portion 17 is such that any pressure exerted by the operator's fingers "clamps" the guide against the work surface.

Having "clamped" the guide by finger pressure against the work surface, hole 14 retains the rotating drill bit in perfect alignment with the work surface.

It should be also noted that should the drill bit accidentally bind in hole 14, the cylindrical nature of guide 11 will permit it to freely rotate in the operator's fingers without any damage whatsoever. In addition the outward flare of arcuate portion 17 where it fairs into upper cylindrical portion 16 prevents the operator's fingers from slipping upwardly on the guide. Thus any danger of the operator's fingers slipping up into contact with the rotating drill bit is eliminated and chances of contact with other moving parts of the drill are greatly reduced.

FIG. 3 illustrates guide 11 being utilized to drill a hole into a board having a raised V-edge. In this instance V-groove 23 on guide bottom surface 13 is simply placed in alignment with and over upper edge 24 of board 26. The guide is held down on board 26 by the operator's fingers 27 in the manner previously described. A drill bit 28 of power drill 29 is then inserted through hole 14 in guide 11. With his other hand 31 the operator actuates power drill 29 to rotate bit 28. Since guide 11 positions bit 28, a hole will be precisely drilled into the edge of board 26. In a similar manner bevels 21 and 22 may be placed against adjacent surfaces if it is desired to drill a hole into the apex of an inside corner or fillet where two adjacent surfaces meet.

It will be understood that indicating notches 20, 45° bevels 21 and 22, and V-notch 23, or any combination of them, may be omitted from drill guide 11. Without any of these features the guide will still be perfectly usable in guiding drills into a flat surface. However, as noted previously, notches 20 enable the guide to be quickly and simply centered at the position where a hole is desired, while bevels 21 and 22, and V-notch 23 enable the guide 11 to be used on specially shaped surfaces or in special positions. Thus, the guide 11 is more versatile with notches, bevels, and the V-notch included thereon.

It is thus seen that guide 11, although simple in construction, permits precisely aligned holes to be drilled into flat surfaces, inside fillets, edges, and it will be apparent, after consideration, even into curved surfaces such as doweling. Thus, if a section of dowel rod were substituted for board 26 in FIG. 3, it will be seen that V-groove 23 would retain guide 11 in exact alignment, thus permitting a hole to be drilled therein.

What is claimed is:
1. A drill guide comprising a generally cylindrical body, first and second flat surfaces forming the top and bottom ends of the body, said second bottom flat surface being in a plane normal to the cylindrical axis of said body, a concavely curved arcuate portion comprising at least a part of the generally cylindrical surface of said body and intermediate the ends thereof, said generally cylindrical body further defining a cylindrical drill bit guide hole coincident with the cylindrical axis of the guide and passing entirely therethrough, and said second bottom surface and the adjacent cylindrical surface of said body defining first and second 45° bevels, said bevels being spaced at diametrically opposite sides of said bottom and cylindrical surface.

References Cited
UNITED STATES PATENTS

| | | | |
|---|---|---|---|
| 2,008,436 | 7/1935 | Cross | 10—147 |
| 2,554,770 | 5/1951 | Ashton | 10—147 |
| 2,788,684 | 4/1957 | Scharf | 77—62 |
| 710,257 | 9/1902 | DeLeeuw | 77—62 |

OTHER REFERENCES

American Machinist publication, "Guided Center-Punch Has Crossed Knife-Edges," by Howard C. DeHeer, p. 124, Aug. 29, 1946.

Modern Plastics publication, "Product Development," p. 108, February 1944.

FRANCIS S. HUSAR, *Primary Examiner.*